(12) United States Patent
Lee

(10) Patent No.: US 11,653,634 B2
(45) Date of Patent: May 23, 2023

(54) METHOD AND DEVICE FOR ADJUSTING AQUARIUM WATER TEMPERATURE THROUGH DIRECT HEAT EXCHANGE

(71) Applicant: ElecQUA Co., Ltd., Seoul (KR)

(72) Inventor: Han Choon Lee, Paju-si (KR)

(73) Assignee: ELECQUA CO., LTD., Seoul (KR)

( * ) Notice: Subject to any disclaimer, the term of this patent is extended or adjusted under 35 U.S.C. 154(b) by 0 days.

(21) Appl. No.: 16/489,825

(22) PCT Filed: Mar. 11, 2019

(86) PCT No.: PCT/KR2019/002785
§ 371 (c)(1),
(2) Date: Aug. 29, 2019

(87) PCT Pub. No.: WO2020/184745
PCT Pub. Date: Sep. 17, 2020

(65) Prior Publication Data
US 2021/0400930 A1 Dec. 30, 2021

(51) Int. Cl.
*A01K 63/06* (2006.01)
*F25B 21/04* (2006.01)

(52) U.S. Cl.
CPC ............ *A01K 63/065* (2013.01); *F25B 21/04* (2013.01); *F25B 2321/023* (2013.01); *F25B 2321/0212* (2013.01); *F25B 2321/0252* (2013.01)

(58) Field of Classification Search
CPC ................... A01K 63/065; F25B 21/04; F25B 2321/0212; F25B 2321/023; F25B 2321/0252
See application file for complete search history.

(56) References Cited

U.S. PATENT DOCUMENTS

| 5,299,424 A | * | 4/1994 | Woodson | A01K 63/065 |
| | | | | 119/245 |
| 10,312,180 B2 | * | 6/2019 | Hwang | H01L 23/473 |
| 11,274,217 B2 | * | 3/2022 | Matsubara | C09D 1/00 |
| 2009/0229533 A1 | * | 9/2009 | Marks | A01K 63/06 |
| | | | | 119/260 |

FOREIGN PATENT DOCUMENTS

| JP | 07-049157 A | | 2/1995 |
| JP | 2016137115 A | * | 8/2016 |
| KR | 10-2008-0107133 A | | 12/2008 |
| KR | 10-2015-0014355 A | | 2/2015 |
| KR | 10-2016-0095736 A | | 8/2016 |
| KR | 10-1900187 B1 | | 11/2018 |
| KR | 102022372 B1 | * | 1/2019 |
| WO | 2016/110753 A1 | | 7/2016 |
| WO | WO-2019176463 A1 | * | 9/2019 | ............ C09D 1/00 |

* cited by examiner

*Primary Examiner* — Ana M Vazquez
(74) *Attorney, Agent, or Firm* — LRK Patent Law Firm

(57) ABSTRACT

A method for adjusting an aquarium water temperature through direct heat exchange by a water temperature adjustment apparatus for an aquarium includes: a first step of allowing a smart sensor unit to measure the temperature of the water; a second step of controlling a heat exchange adjuster that sunk in the water to adjust the temperature of the water based on the temperature of the water measured by the smart sensor unit; and a third step of allowing the heat exchange adjuster to adjust direct heat exchange with the water.

8 Claims, 7 Drawing Sheets

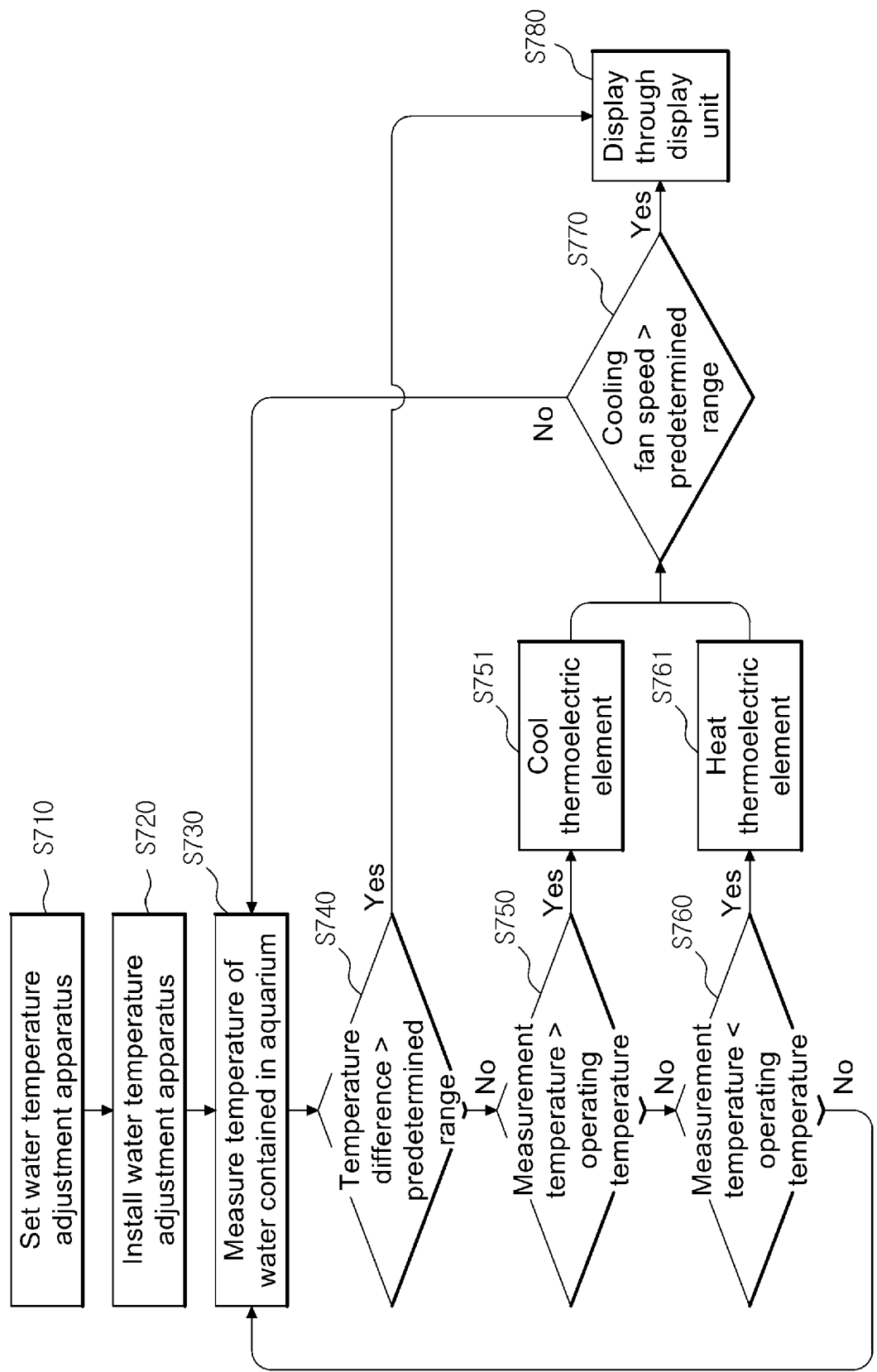

METHOD AND DEVICE FOR ADJUSTING AQUARIUM WATER TEMPERATURE THROUGH DIRECT HEAT EXCHANGE

CROSS-REFERENCE TO RELATED APPLICATION

The present application is a U.S. National Phase entry from International Application No. PCT/KR2019/002785, filed Mar. 11, 2019, the disclosure of which is incorporated by reference herein in its entirety.

BACKGROUND

1. Technical Field

The present invention relates to a method and device for adjusting an aquarium water temperature through direct heat exchange.

2. Description of Related Art

Recently, as overseas research results are known that aquariums collect fine dust and have a positive effect on child development and emotional stability, the number of families raising various fish species in an aquarium is increasing.

In general, it is important to maintain a temperature environment that is suitable for growing according to characteristics of each species in aquariums such as an aquarium or a fish tank to grow fish species.

For this purpose, a heater in which a heating element such as a nichrome wire is wrapped with quartz glass to be settled directly in water in an aquarium to heat water is conventionally used for the winter season, but fish may be killed due to a short circuit caused by glass breakage of the heating element or an electrical leakage phenomenon caused by a wire covering damage or insulation failure. In order to prevent this problem, a heater using stainless steel has been introduced, but stainless steel has a problem that the thermal conductivity is low and the complete corrosion prevention is impossible.

In addition, there is a problem in that it is necessary to install and remove a heater and a cooler every season, such as installing a cooling device separately in a summer season.

In addition, since a typical heater rod has a large size and requires a large installation area, it is difficult to install a small heater in a small-sized aquarium.

To solve these problems, devices using thermoelectric elements have been developed, and Korean Patent Publication No. 10-2015-0014355 discloses such a conventional technique.

However, the conventional art uses an external circulation delivery system that operates by circulating water using a water pump, and thus an installation position thereof that is more distant from the aquarium leads to a length increase of a hose thereof, thereby increasing a heat loss.

Further, a temperature of the aquarium rises by 1 to 2° C. due to a heat generation phenomenon of the water pump.

A condensation phenomenon also occurs due to a temperature difference.

A heat exchanger is corroded so as to not work properly or to pollute water quality.

Sediments such as moss and sludge are deposited inside the heat exchanger and then adhered to deteriorate the flow velocity and thermal conductivity, thereby causing deterioration in performance.

In addition, it is impossible to thoroughly clean sediments due to a difficult structure thereof to be decomposed.

SUMMARY

The prevent invention is contrived to solve the problems, and a technical object to be solved by the present invention is to provide a water temperature adjustment apparatus for an aquarium through direct heat exchange, capable of increasing an efficiency of a thermoelectric element by directly transferring heat energy generated through the thermoelectric element to water contained in the aquarium.

Another technical object to be solved by the present invention is to provide a water temperature adjustment apparatus for an aquarium through direct heat exchange, capable of selectively facilitating heating and cooling while being small in scale.

Yet another technical object to be solved by the present invention is to provide a water temperature adjustment apparatus for an aquarium through direct heat exchange, capable of easily washing sediments such as moss and sludge by easy installation/removal/washing.

To solve the technical objects, an aspect of the present invention features a method of adjusting an aquarium water temperature by a water temperature adjustment apparatus for an aquarium, including: a first step of allowing a smart sensor unit to measure the temperature of the water; a second step of controlling a heat exchange adjuster that sunk in the water to adjust the temperature of the water based on the temperature of the water measured by the smart sensor unit; and a third step of allowing the heat exchange adjuster to adjust direct heat exchange with the water.

Herein, the smart sensor unit may include a plurality of temperature sensors, and in the second step, the heat exchange adjuster that is sunk in the water may be controlled based on an average of temperatures of the water measured by the temperature sensors.

In addition, the smart sensor unit may include a plurality of temperature sensors, and the adjusting method may further include a fourth step of comparing differences between water temperatures measured by the temperature sensors and controlling a display unit to perform informing when the temperature differences are beyond a predetermined temperature difference range of the smart sensor unit.

Herein, the second step may be a step of allowing the control unit to control the heat exchange adjuster to maintain the temperature of the water at a constant temperature.

An aspect of the present invention features a water temperature adjustment apparatus for an aquarium, which adjusts a temperature of water contained in the aquarium, including: a main body detachably mounted to the aquarium; a heat exchange adjuster provided at a lower portion of the main body and sunk in the water to adjust direct heat exchange with the water. A smart sensor unit configured to measure a temperature of the water; and a control unit configured to control the heat exchange adjuster to adjust the temperature of the water based on the temperature of the water measured by the smart sensor unit.

Herein, the control unit may be provided at an upper portion of the main body and may be attachable to or detachable from the main body.

Herein, the heat exchange adjuster may include: a thermoelectric element configured to be heated or cooled; and a heat exchange member configured to transfer a heating or cooling state of the thermoelectric element to the water while being in close contact with one end surface of the thermoelectric element.

Herein, the heat exchange member may be obtained by forming an anti-oxidation film on a material having high thermal conductivity.

In addition, the water temperature adjustment apparatus may further include a heat dissipater provided at an upper portion of the heat exchange to cool heat generated from the heat exchange adjuster, the control unit may include: a cooling fan configured to discharge heat of the thermoelectric element transferred through the heat dissipater; a controller configured to determine abnormality of the cooling fan; a storage configured to store a predetermined fan speed range of the cooling fan; and a display unit configured to indicate that the cooling fan is abnormal, and the control unit controls the display unit to perform informing when a fan speed is beyond the predetermined fan speed range of the cooling fan.

Herein, the smart sensor unit may include a plurality of temperature sensors.

Herein, the control unit may include: a storage configured to store a predetermined temperature difference range of the smart sensor unit; a controller configured to determine abnormality of the smart sensor unit; and a display unit configured to indicate that the smart sensor unit is abnormal, and the control unit may compare differences between water temperatures measured by the temperature sensors and may control a display unit to perform informing when the temperature differences are beyond a predetermined temperature difference range of the smart sensor unit.

The control unit may control the heat exchange adjuster based on an average of temperatures of the water measured by the temperature sensors.

Herein, the heat exchange adjuster may maintain the temperature of the water at a constant temperature.

According to the prevent invention, a loss may be blocked during the transfer of energy by completely vertically sinking the entire heat exchange adjuster that can selectively perform cooling and heating in the water contained in the aquarium, and performance deterioration of the thermoelectric element may be prevented by rapid heat energy transfer, thereby efficiently maintaining the temperature of the water at the constant temperature.

The present invention has an effect of preventing the condensation phenomenon without using the heat insulating material, which is eco-friendly, and an effect of efficiently maintaining the water temperature at the constant temperature without a separate apparatus (water pump, hose, etc.).

According to the present invention, the heat exchange adjuster and the heat dissipater are arranged side by side in the vertical direction by using heat pipes to maintain a wind direction vertically, and thus heat may be quickly absorbed from the exchange adjuster and may be smoothly discharged to the outside by securing abundant airflow and wind speed and minimizing the heat path, thereby efficiently performing heat exchange with the outside air.

According to the present invention, the heat exchange member may prevent the generation of oxides by using a high thermal conductive characteristic and performing an oxidation preventing function, and thus it may be applied to a general freshwater aquarium as well as to a saltwater aquarium containing a large amount of salt.

The present invention may be small in size, thereby reducing the production cost, and may be installed and moved anywhere on the four sides of the upper opening of the aquarium without any additional materials, and thus anyone may be install easily and conveniently in the aquarium.

In addition, according to the present invention, the heat exchange adjuster may be easily cleaned to easily wash the deposits such as moss and sludge, and easy cleaning of sediments may prevent deterioration of the heat exchanger adjuster.

BRIEF DESCRIPTION OF THE DRAWINGS

FIG. 7 illustrates a flowchart showing a method of adjusting a temperature of aquarium water through direct heat exchange according to another exemplary embodiment of the present invention.

DETAILED DESCRIPTION OF THE INVENTION

The present invention is intended to illustrate the bars, reference to specific embodiments which may have a number of embodiments can be applied to various changes and describes them in detail from the following detailed description. This, however, is by no means to restrict the invention to the specific embodiments, it is to be understood as embracing all included in the spirit and scope of the present invention changes, equivalents and substitutes.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or be connected or coupled to the other component with a further component intervening therebetween. On the other hand, it is to be understood that when one component is referred to as being "connected or coupled directly" to another component, it may be connected to or coupled to the other component without another component intervening therebetween.

It is also to be understood that the terminology used herein is only for the purpose of describing particular embodiments, and is not intended to be limiting of the invention. Singular forms are to include plural forms unless the context clearly indicates otherwise. It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

Figure 1:
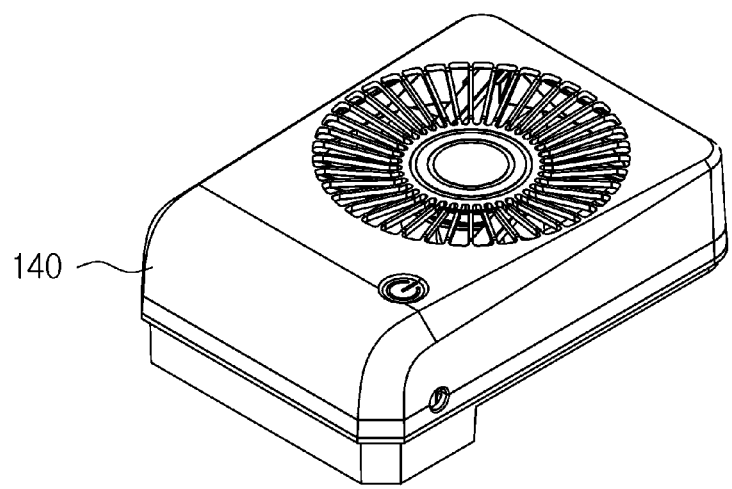
FIG. 1 illustrates a schematic view of a water temperature adjustment apparatus for an aquarium through direct heat exchange according to an exemplary embodiment of the present invention.
Figure 1:
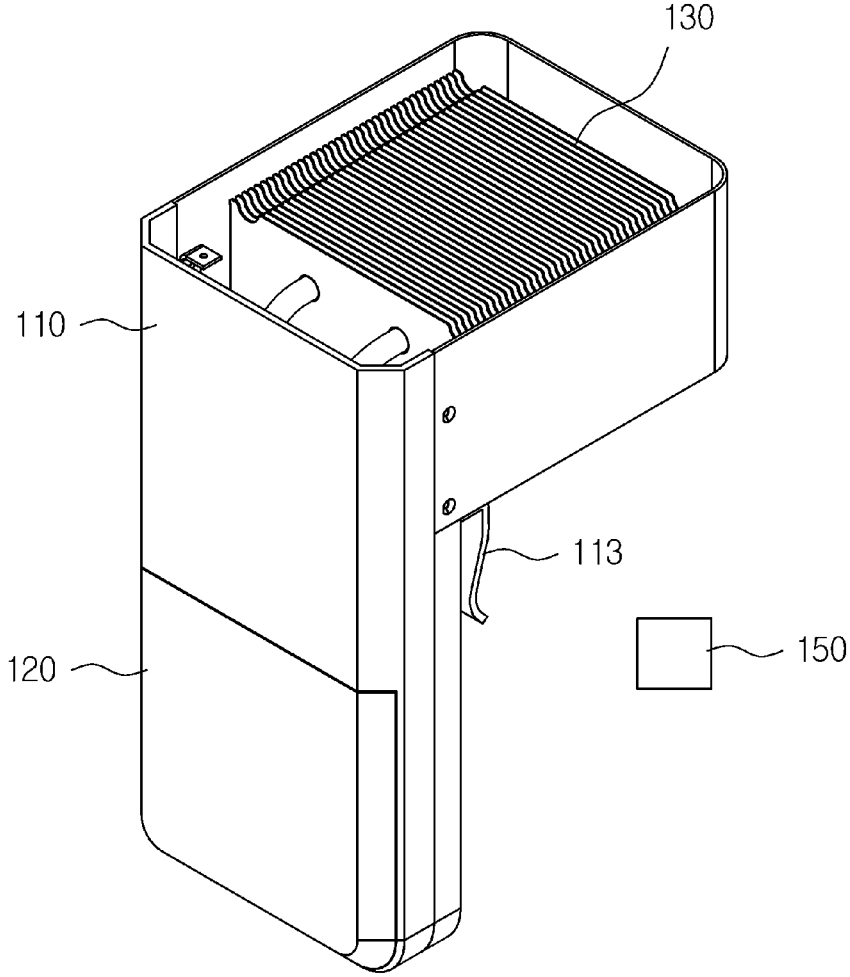

FIG. 1 illustrates a schematic view of a water temperature adjustment apparatus for an aquarium through direct heat exchange according to an exemplary embodiment of the present invention.

Figure 2:
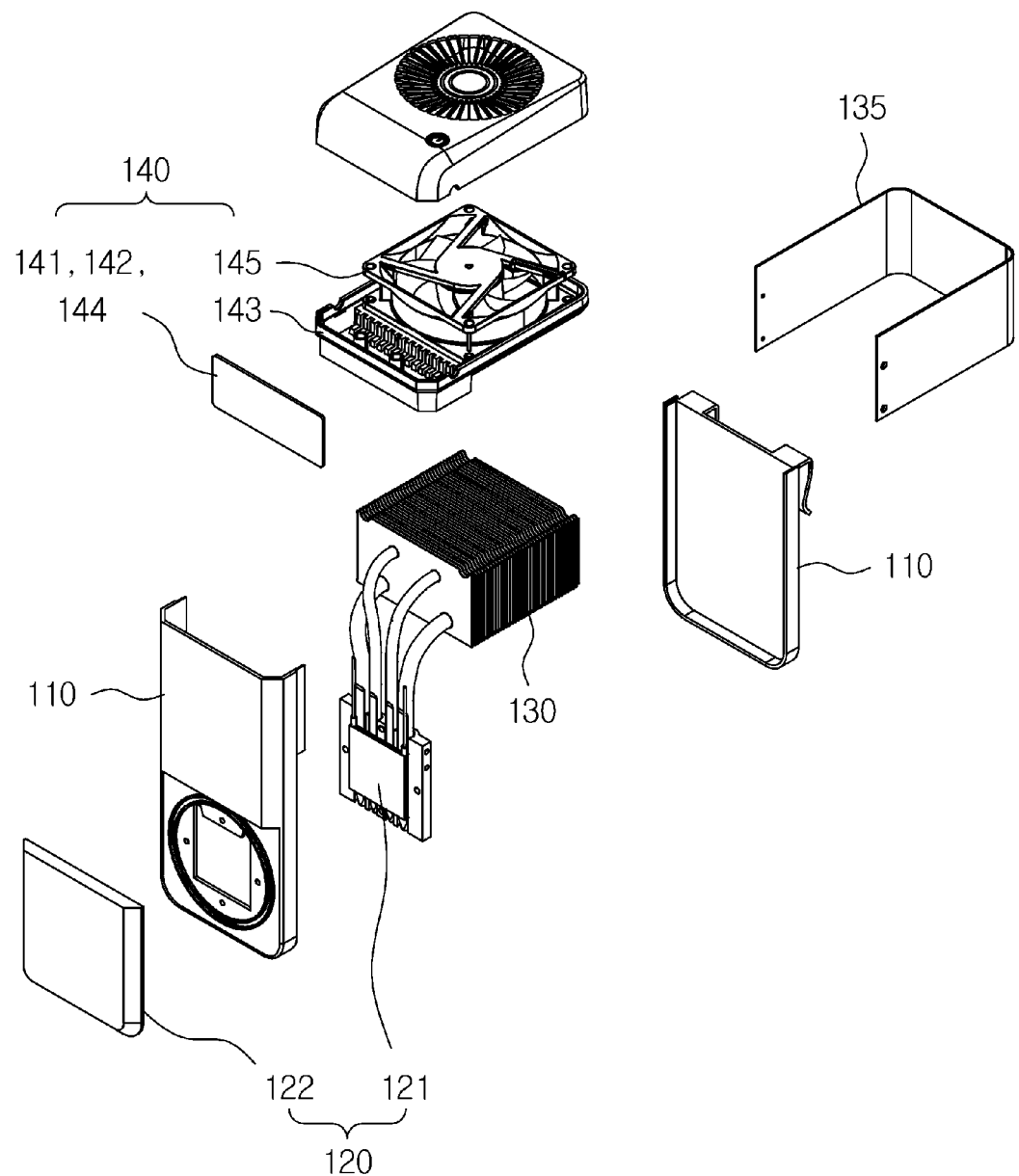
FIG. 2 illustrates an exploded perspective view of a water temperature adjustment apparatus for an aquarium through direct heat exchange according to an exemplary embodiment of the present invention.

FIG. 2 illustrates an exploded perspective view of a water temperature adjustment apparatus for an aquarium through direct heat exchange according to an exemplary embodiment of the present invention.

Referring to FIG. 1 and FIG. 2, a water temperature adjustment apparatus 100 for an aquarium includes a main body 110, a heat exchange adjuster 120, heat dissipaters 130, a control unit 140, and a smart sensor unit 150.

The main body 110 is a place where the heat exchange adjuster 120 and the heat dissipater 130 are mounted, and a hooking groove 113 that can be detachably attached to the aquarium.

The heat exchange adjuster 120 may be provided at a lower portion of the main body 110 to include a thermoelectric element 121 and a heat exchange member 122, and the entire heat exchange adjuster 120 may be completely vertically sunk in water contained in the aquarium to adjust direct heat exchange with the water so that a temperature of the water can be maintained at a constant temperature.

The thermoelectric element 121 is a Peltier element, to be heated or cooled under the control of the control unit 140.

The heat exchange member 122 is installed in close contact with a front surface of the thermoelectric element 121, and is sunk in the water contained in the aquarium to directly transfer heat energy of the thermoelectric element 121 to the water contained in the aquarium and perform heat exchange therewith so that the temperature of the water can be maintained at a constant temperature.

The heat exchange member 122 may be formed by compressing and sintering a powder of a metal such as aluminum having high thermal conductivity or a high thermal conductivity material, and a film may be formed on a surface thereof to prevent generation of oxide and contamination. Accordingly, it may be applied to a general freshwater aquarium as well as to a saltwater aquarium containing a large amount of salt.

The heat dissipaters 130 are vertically provided at an upper portion of the heat exchange adjuster 120 to cool heat generated by the thermoelectric element 121 of the heat exchange adjuster 120.

The control unit 140 is provided at an upper portion of the main body 110 to be detachable from the main body 110, and to control the heat exchange adjuster 120 to adjust the temperature of the water based on the temperature of the water measured by the smart sensor unit 150.

Specifically, the control unit 140 receives the temperature of the water contained in the aquarium from the smart sensor unit 150 including a plurality of temperature sensors, and heats or cools the thermoelectric element 121 of the heat exchange adjuster 120 by comparing an operating temperature of the thermoelectric element 121 with an average of temperatures of the waver measured by the respective temperature sensors. Herein, the operating temperature of the thermoelectric element 121 may be set through a smart apparatus of a user.

In addition, the control unit 140 compares differences between the water temperatures measured by the temperature sensors of the smart sensor unit 150, and determines that the smart sensor unit 150 is abnormal when the temperature differences are beyond a predetermined temperature difference range of the smart sensor unit 150, to report it to the user.

The control unit 140 determines that a cooling fan 145 is abnormal when a fan speed of the cooling fan 145 is beyond a predetermined fan speed range of the cooling fan 145, to report it to the user. Herein, the predetermined temperature difference range of the smart sensor unit 150 and the predetermined fan speed range of the cooling fan 145 may be set by the user through a smart apparatus.

The smart sensor unit 150 includes the temperature sensors, and is sunk in the water contained in the aquarium, to measure the temperature of the water contained in the aquarium, and transmit it to the control unit 140 connected thereto in a wire or wireless manner.

Figure 3:
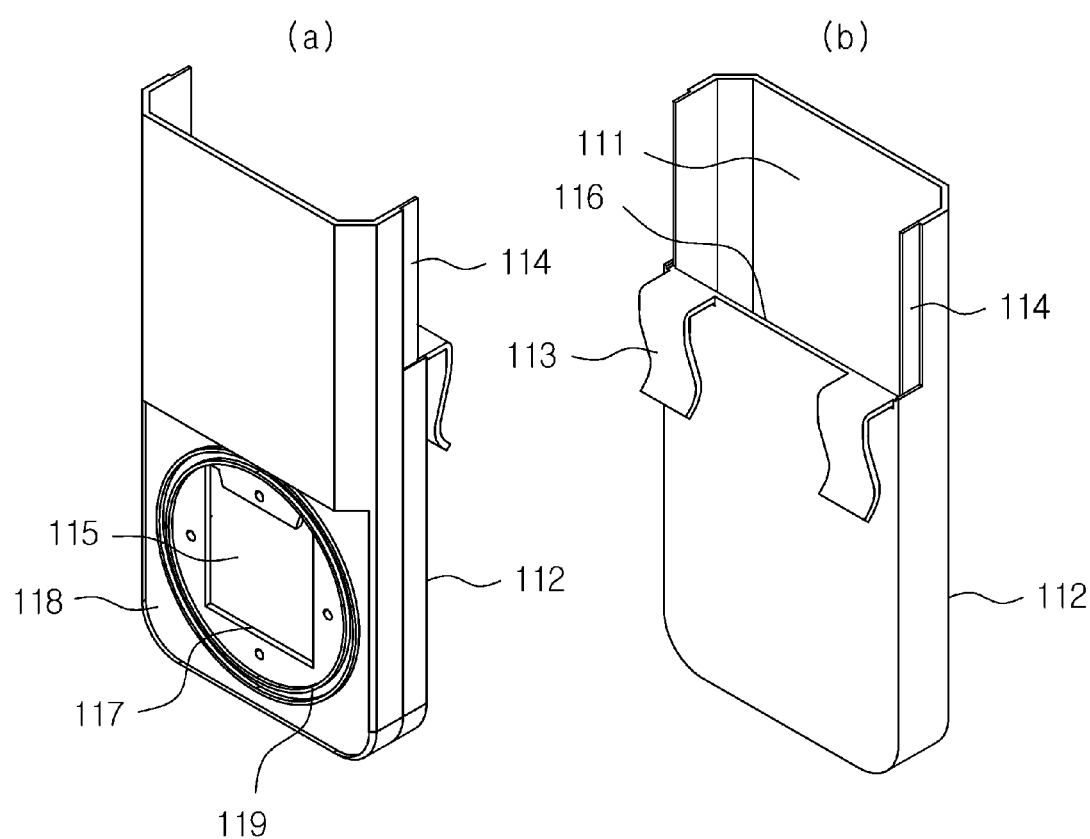
FIG. 3 illustrates a perspective view of a main body according to an exemplary embodiment of the present invention.

FIG. 3 illustrates a perspective view of a main body according to an exemplary embodiment of the present invention. Specifically, in FIG. 3, (a) illustrates a front perspective view and (b) illustrates a rear perspective view.

Referring to FIG. 3, the main body 110 includes a first mounter 111 on which the heat dissipaters 130 are mounted and a second mounter 112 on which the heat exchange adjuster 120 is tightly fixed.

The hooking groove 113 that can allow the water temperature adjuster 100 to be mounted in the aquarium is formed on an end surface of the first mounter 111.

In addition, a close contact jaw 114 may be formed at opposite ends of the first mounter 111 such that opposite end portions of a cover 135 for covering heat sinks 133 of the heat dissipaters 130 are tightly contacted and fixed.

The second mounter 112 has an internal space and an upper end portion in which a through hole 116 is formed such that base blocks 131 of the heat dissipaters 130 are inserted through the through hole 116 to be mounted in the internal space.

In addition, a mounting hole 117 is formed at an end portion of the second mounter 112 such that the thermoelectric element 121 may be inserted and seated therein.

A close contact portion 118 with which the heat exchange member 122 is in close contact is provided on an external circumferential surface of the mounting hole 117, and the heat exchange member 122 is attached to or detached from the contact portion 118. In this case, when the heat exchange member 122 is closely attached to the contact portion 118, the thermoelectric element 121 mounted in the mounting hole 117 and the heat exchange member 122 may come into close contact with each other to directly transfer a heating or cooling state of the thermoelectric element 121 to the water contained in the aquarium through the heat exchange member 122, and since the heat exchange member 122 is detachable, the heat exchange member 122 may be detached and washed after use to remove foreign substances such as moss. In addition, an opening hole that is opened to allow fixing means for fixing the base blocks 131 mounted in the internal space 115 and the heat exchanging member 122 closely contacted in the contact portion 118 to the main body to be installed and a stopper for sealing an internal space of the opening hole may be provided at the other end portion of the close contact portion 118, and an o-ring for preventing water leakage may be installed in an internal circumference of the stopper.

A packing groove 119 is formed in an internal circumference of the close contact portion 118 such that a packing member is inserted and mounted therein to prevent leakage.

Figure 4:
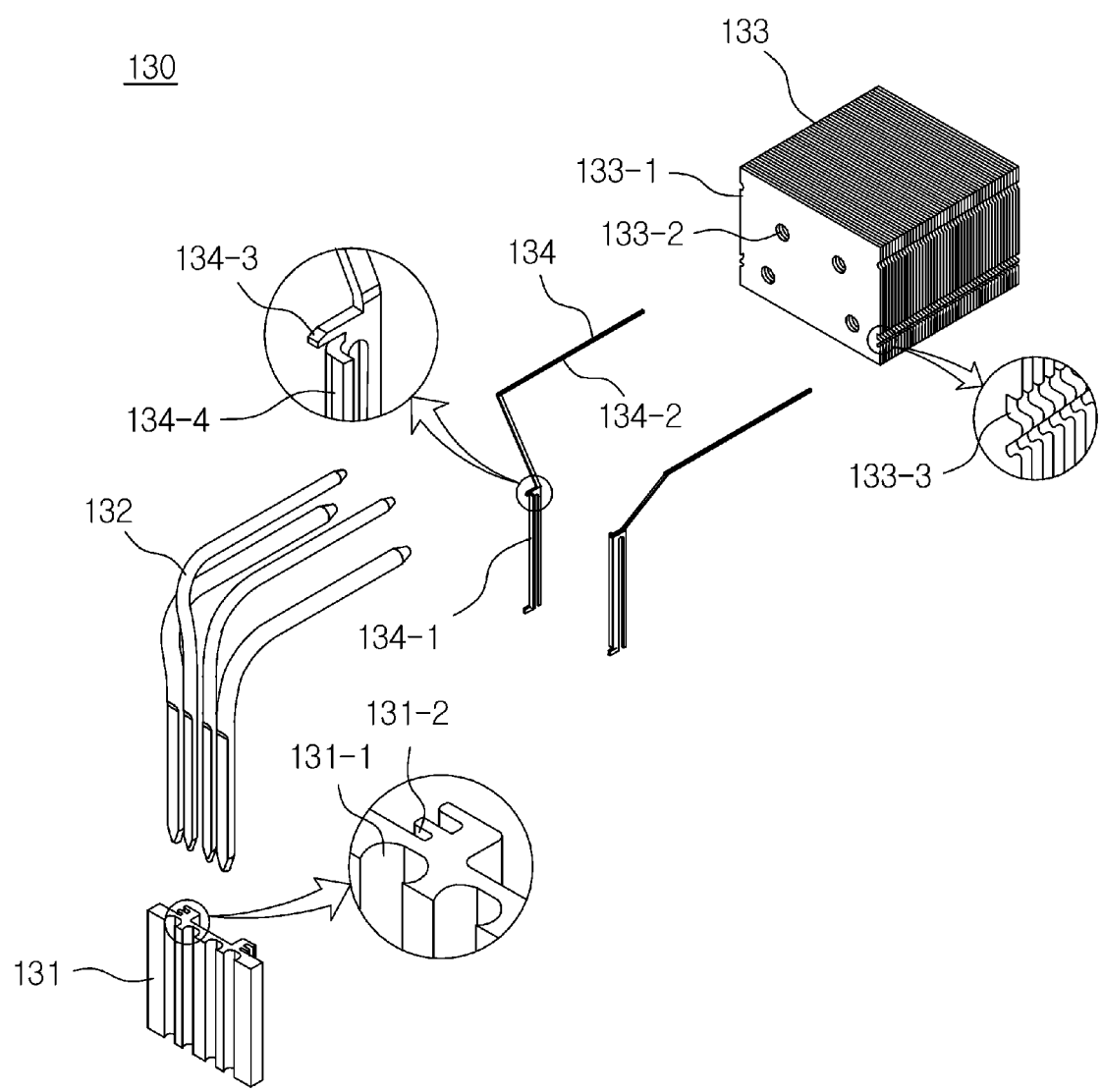
FIG. 4 illustrates an exploded perspective view of a heat dissipater according to an exemplary embodiment of the present invention.

FIG. 4 illustrates an exploded perspective view of a heat dissipater according to an exemplary embodiment of the present invention.

Referring to FIG. 4, the heat dissipater 130 is provided at an upper portion of the heat exchange adjuster 120 to cool the heat generated by the thermoelectric element 121 of the heat exchange adjuster 120, and include the base blocks 131, heat pipes 132, heat sinks 133, and support brackets 134.

The base blocks 131 are mounted in the internal space 115 of the second mounter 112 to be in close surface-contact with the thermoelectric element 121 inserted and seated in the mounting hole 117, to have a first end portion on which heat pipe insertion grooves 131-1 opened to allow the heat pipes 132 to be inserted and mounted therein are formed and a second end portion on which catching protrusion insertion grooves 131-2 in which catching protrusions 134-3 formed at mounting portions 134-1 of support brackets 134 are inserted and mounted are formed.

Each of the heat pipes 132, which serves to transfer heat generated from the thermoelectric element 121 which is in close surface-contact with the base block 131 to the heat sink 133, entirely have a reverse L-shape, having a first end portion which is inserted and mounted in the heat pipe insertion groove 131-1 and a second end portion which is inserted through the through hole 133-2 of the heat sink 133.

In this case, a first end portion of the heat pipe 132 forms a flat surface such that it is inserted and mounted in the opened heat pipe insertion groove 131-1 to be in close surface-contact with the thermoelectric element 121, and a second end portion thereof forms a cylindrical shape such that it is smoothly inserted through the through hole 133-2 formed in the heat sink 133.

The heat sinks 133, which serve to absorb and externally discharge the heat transferred through the heat pipes 132, are configured in one bundle shape including a plurality of heat dissipation plates each in which through holes 133-2 through which second end portions of the heat pipes 132 are inserted and supporter insertion grooves 133-3 into which supporters 134-2 of the support brackets 134 are formed.

Hereinafter, the heat sinks 133 will be referred to as heat dissipation plates 133-1 one by one, and the heat dissipation plates 133-1 will be referred to as one heat sink 133 in a bundle.

In addition, the cover 135 having opposite end portions that are closely contacted and fixed to the close contact jaw 214 of the main body 110 described above to surround and protect the outside of the heat sink 133 may be included in the heat dissipaters 130.

Each of the support brackets 134, which supports the heat sink 133 at opposite sides to support it, includes a mounting portion 134-1 and a support portion 134-2.

The mounting portion 134-1 is disposed in a vertical direction, and the catching protrusion 134-3 which is inserted and mounted in the catching protrusion insertion groove 131-2 of the base block 131 described above is formed to protrude in a longitudinal direction.

Close contact protrusions 134-4 may be respectively formed at an upper end portion and a lower end portion of the catching protrusion 134-3 so as to be in close surface-contact with an upper end portion and a lower end portion of the base block 131.

The supporters 134-2 are disposed in a horizontal direction, and are respectively inserted into the supporter insertion grooves 133-3 formed in the heat dissipation plates 133-1 to support the heat dissipation plates 133-1 such that the heat dissipation plates 133-1 constitute one bundle type of heat sink 133 in a state of being separated from each other at a constant interval. In this case, the heat dissipation plates 418 are spaced at the constant interval in order to dissipate heat more quickly and smoothly. Herein, the base blocks 131, the heat pipes 132, the heat dissipation plates 133-1, and the cover 135 may be formed of a metal such as aluminum having a high thermal conductivity.

Figure 5:
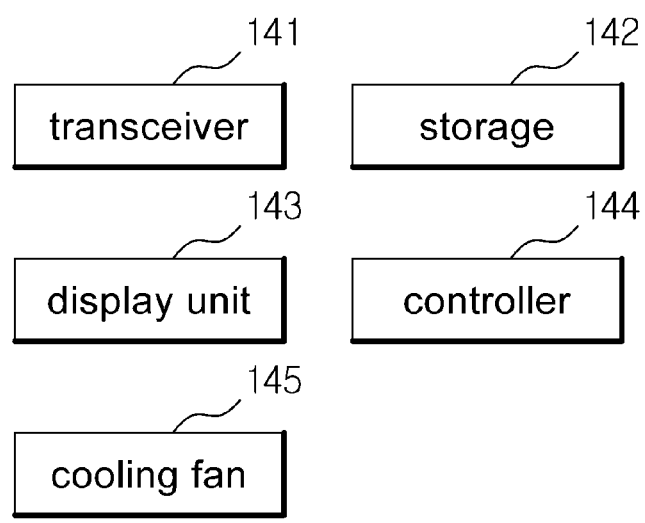
FIG. 5 illustrates a schematic view of a control unit according to an exemplary embodiment of the present invention.

FIG. 5 illustrates a schematic view of a control unit according to an exemplary embodiment of the present invention.

Referring to FIG. 5, the control unit 140 includes a transceiver 141, a storage 142, a display unit 143, a controller 144, and the cooling fan 145.

The transceiver 141 may receive the temperature of the water contained in the aquarium measured by the smart sensor unit 150, the predetermined temperature difference range of the smart sensor unit 150 and the predetermined fan speed range of the cooling fan 145 set by the user through a smart apparatus, and the operating temperature of the thermoelectric element 121.

In addition, when the smart sensor unit 150 or the cooling fan 145 has an error, the transceiver 141 transmits it to the user smart apparatus.

The storage 142 stores the predetermined temperature difference range of the smart sensor unit 150, the predetermined fan speed range of the cooling fan 145, and the operating temperature of the thermoelectric element 121 received through the transceiver unit 141.

The display unit 143 displays an abnormal state of the smart sensor unit 150, an abnormal state of the cooling fan 145, a heating or cooling state, and an operating state of the thermoelectric module 121. Herein, the display unit 143 may display a LED window as green when the thermoelectric element 121 is not operated and is in a standby state, as yellow when the smart sensor unit 150 is abnormal, as purple when the thermoelectric module 121 is abnormal, as red when the thermoelectric module 121 is heated, and as blue when the thermoelectric module 121 is cooled.

The controller 144 heats or cools the thermoelectric element 121 by comparing the operating temperature of the thermoelectric element 121 stored in the storage 142 with an average of temperatures of the waver measured by the respective temperature sensors included in the smart sensor unit 150. Specifically, the thermoelectric module 121 is heated when the average of the temperatures of the water measured by the temperature sensors of the smart sensor unit 150 is lower than the operating temperature of the thermoelectric element 121 stored in the storage unit 142, and is cooled in the opposite case.

In addition, the controller 144 compares differences between the water temperatures measured by the temperature sensors of the smart sensor unit 150, and determines that the smart sensor unit 150 is abnormal when the temperature differences are beyond a predetermined temperature difference range of the smart sensor unit 150 stored in the storage 142, to control the transceiver 141 to transmit it to the user smart apparatus through the transceiver 141 or to perform warning through the display unit 143.

In addition, the control unit 144 operates the cooling fan 145 when the thermoelectric element 121 is operated, and simultaneously determines that the cooling fan 145 is abnormal when the fan speed is beyond the predetermined fan speed range of the cooling fan 145 stored in the storage 142, to transmit it to the user smart apparatus through the transceiver 141 or to perform warming through the display unit 143.

When the control unit 140 is coupled to the main body 110, the cooling fan 145 is disposed at upper ends of the heat dissipaters 130, to externally discharge the heat of the thermoelectric element 121 transferred through the heat dissipaters 130 under the control of the controller 144.

Figure 6:
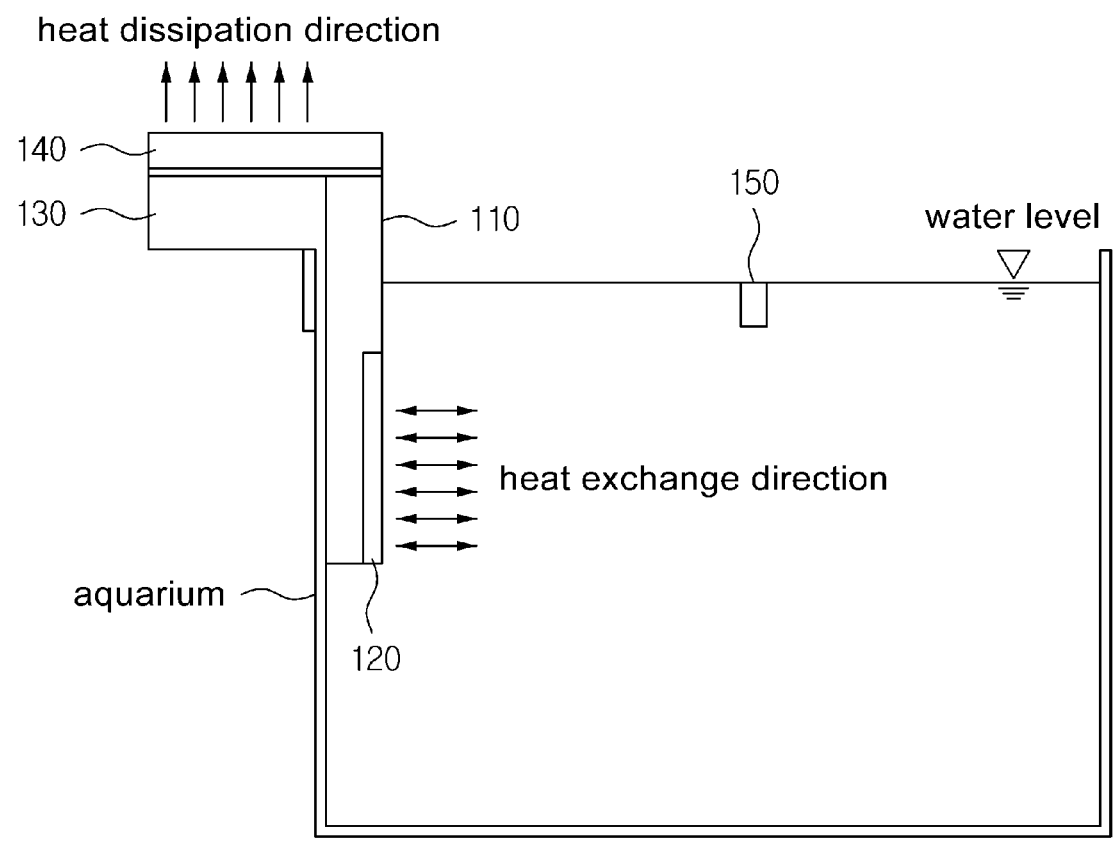
FIG. 6 illustrates a schematic view showing a state in which a water temperature adjustment apparatus is installed in an aquarium according to an exemplary embodiment of the present invention.

FIG. 6 illustrates a schematic view showing a state in which a water temperature adjustment apparatus is installed in an aquarium according to an exemplary embodiment of the present invention.

Referring to FIG. 6, when the smart sensor unit 150 installed in the water contained in the aquarium measures the temperature of the water contained in the aquarium and transmits it to the control unit 140, the control unit 140 heats or cools the thermoelectric element 121 by comparing the operating temperature of the thermoelectric element 121 with an average of temperatures of the waver measured by the respective temperature sensors included in the smart sensor unit 150.

When the thermoelectric element 121 is heated or cooled under the control of the control unit 140, the heating or cooling state of the thermoelectric element 121 is transferred to the heat exchange member 122 that is in close contact with the thermoelectric element 121 to exchange heat energy directly with the water contained in the aquarium so that the water temperature is maintained at a constant temperature.

Although FIG. 6 illustrates one water temperature adjustment apparatus 100 for an aquarium, it is possible to install and use a plurality of water temperature adjustment apparatuses 100. When the plurality of water temperature adjustment apparatuses 100 are installed and used, the water temperature adjustment apparatuses 100 may be grouped to control them by transmitting commands to the control unit 140 using the user smart apparatus.

FIG. 7 illustrates a flowchart showing a method of adjusting a temperature of aquarium water through direct heat exchange according to another exemplary embodiment of the present invention.

Referring to FIG. 7, in step S710, a user sets an operating temperature of the thermoelectric element 121, a predetermined temperature difference range of the smart sensor unit 150, and a predetermined fan speed range of the cooling fan 145 to store them in the storage 142 of the control unit 140.

In step S720, the water temperature adjustment apparatus 100 is installed in the aquarium.

In step S730, the smart sensor unit 150 measures a temperature of water contained in the aquarium to transmit it to the transceiver 141 of the control unit 140.

In step S740, the controller 144 of the control unit 140 compares differences between water temperatures measured by temperature sensors of the smart sensor unit 150, and proceeds to step S780 when the temperature differences are beyond the predetermined temperature difference range of the smart sensor unit 150 stored in the storage 142 and proceeds to step S750 when they are not beyond the predetermined temperature difference range of the smart sensor unit 150.

In step S750, the controller 144 of the control unit 140 compares the operating temperature of the thermoelectric element 121 stored in the storage 142 with an average of temperatures of the waver measured by the respective temperature sensors included in the smart sensor unit 150, and proceeds to step S751 when the temperature average is higher than the operating temperature of the thermoelectric element 121 and proceeds to step S760 when it is not higher than the operating temperature.

In step S751, the controller 144 of the control unit 140 cools the thermoelectric element 121 of the heat exchange adjuster 120 sunk in the water to adjust the temperature of the water and simultaneously operates the cooling fan 145 of the control unit 140. Herein, a cooling state of the thermoelectric element 121 is transferred to the heat exchange member 122 of the heat exchange adjuster 120 to exchange heat energy directly with the water contained in the aquarium so as to adjust the temperature of the water contained in the aquarium such that the water temperature is maintained at a constant temperature.

In step S760, the controller 144 of the control unit 140 compares the operating temperature of the thermoelectric element 121 stored in the storage 142 with an average of temperatures of the waver measured by the respective temperature sensors included in the smart sensor unit 150, and proceeds to step S761 when the temperature average is lower than the operating temperature of the thermoelectric element 121 and proceeds to steps S730 to S750 when it is not lower than the operating temperature.

In step S761, the controller 144 of the control unit 140 heats the thermoelectric element 121 of the heat exchange adjuster 120 sunk in the water to adjust the temperature of the water and simultaneously operates the cooling fan 145. Herein, a heating state of the thermoelectric element 121 is transferred to the heat exchange member 122 of the heat exchange adjuster 120 to exchange heat energy directly with the water contained in the aquarium so as to adjust the temperature of the water contained in the aquarium such that the water temperature is maintained at a constant temperature.

In step S770, the controller 144 of the control unit 140 proceeds to step S780 when the fan speed is beyond the predetermined fan speed range of the cooling fan 145 stored in the storage 142 stored in the storage 142 and proceeds to steps S730 to S760 when the fan speed is not beyond the predetermined fan speed range of the cooling fan 145.

In step S780, the controller 144 of the control unit 140 determines that the smart sensor unit 150 or the cooling fan 135 is abnormal and indicates that it is in an abnormal state through the display unit 143 or informs the user smart apparatus that the water temperature adjustment apparatus 100 is abnormal through the transceiver 141.

The above descriptions are provided for illustrative purposes of the technical concepts of the present invention, and a person having ordinary skill in the art may understand that various other modifications or equivalents are possible without departing from the natural characteristics of the present invention.

Consequently, the true technical protective scope of the present invention must be determined based on the technical spirit of the appended claims.

The invention claimed is:

1. A water temperature adjustment apparatus for an aquarium, for adjusting a temperature of water contained in the aquarium, the water temperature adjustment apparatus comprising:
   a main body detachably mounted to the aquarium;
   a heat exchange adjuster provided at a lower portion of the main body and entirely sunk in the water to adjust direct heat exchange with the water;
   a smart sensor unit configured to measure the temperature of the water;
   a control unit configured to control the heat exchange adjuster to adjust the temperature of the water based on the temperature of the water measured by the smart sensor unit; and
   a heat dissipater provided at an upper portion of the heat exchange adjuster to cool heat generated from the heat exchange adjuster,
   wherein the heat exchange adjuster includes:
   a thermoelectric element configured to be heated or cooled; and a heat exchange member configured to transfer a heating state or a cooling state of the thermoelectric element to the water while being in close contact with one end surface of the thermoelectric element, wherein the heat exchange adjuster and the heat dissipater are arranged side by side in the vertical direction to each other, wherein the main body comprises a first mounting portion and a second mourning portion such that the heat dissipater is mounted on the first mounting portion and the heat exchange adjuster is attached to the second mounting portion, wherein the second mounting portion has a mounting hole formed at one end, thereof such that the thermoelectric element is inserted and mounted therein, and wherein a contact portion is provided on an outer circumferential surface of the mounting hole such that the heat exchange member is detachably attached to the contact portion.

2. The water temperature adjustment apparatus of claim 1, wherein the control unit is provided at an upper portion of the main body and is attachable to or detachable from the main body.

3. The water temperature adjustment apparatus of claim 1, wherein the heat exchange member is obtained by forming an anti-oxidation film on a material having high thermal conductivity.

4. The water temperature adjustment apparatus of claim 1, wherein the control unit includes:
a cooling fan configured to discharge heat of the thermoelectric element transferred through the heat dissipater;
a controller configured to determine abnormality of the cooling fan;
a storage configured to store a predetermined fan speed range of the cooling fan; and
a display unit configured to indicate that, the cooling fan is abnormal,
wherein the controller controls the display unit to perform informing when a fan speed of the cooling fan is beyond the predetermined fan speed range of the cooling fan.

5. The water temperature adjustment apparatus of claim 1. wherein the smart sensor unit includes a plurality of temperature sensors.

6. The water temperature adjustment apparatus of claim 5, wherein the control unit includes:
a storage configured to store a predetermined temperature difference range of the smart sensor unit;
a controller configured to determine abnormality of the smart sensor unit; and
a display unit configured to indicate that the smart sensor unit is abnormal, and
wherein the controller compares differences between water temperatures measured by the temperature sensors and controls the display unit to perform informing when the temperature differences are beyond the predetermined temperature difference range of the smart sensor unit.

7. The water temperature adjustment apparatus of claim 5, wherein the control unit controls the heat exchange adjuster based on an average of temperatures of the water measured by the temperature sensors.

8. The water temperature adjustment apparatus of claim 1, wherein the heat exchange adjuster maintains the temperature of the water at a constant temperature.

* * * * *